United States Patent Office 2,776,427
Patented Jan. 1, 1957

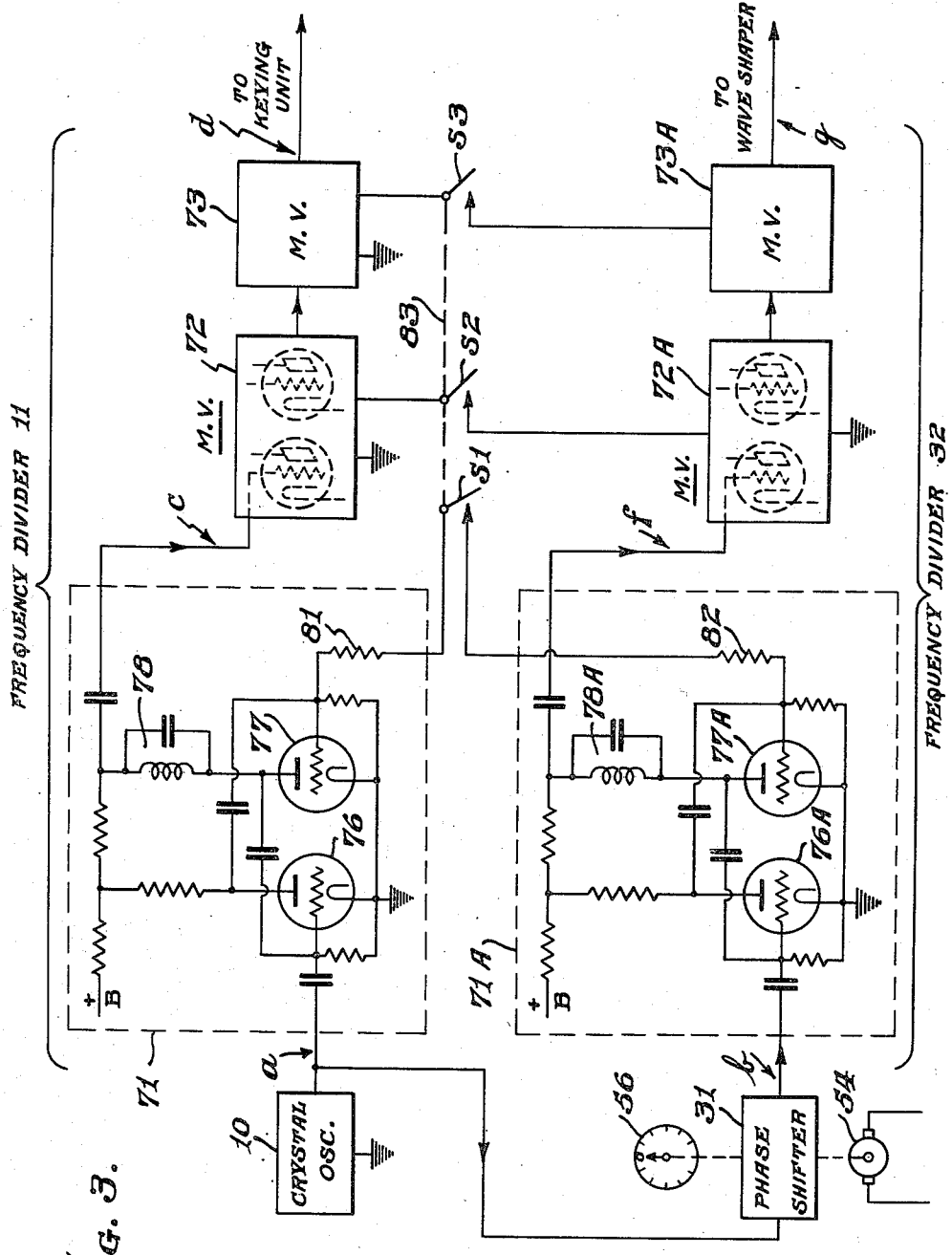

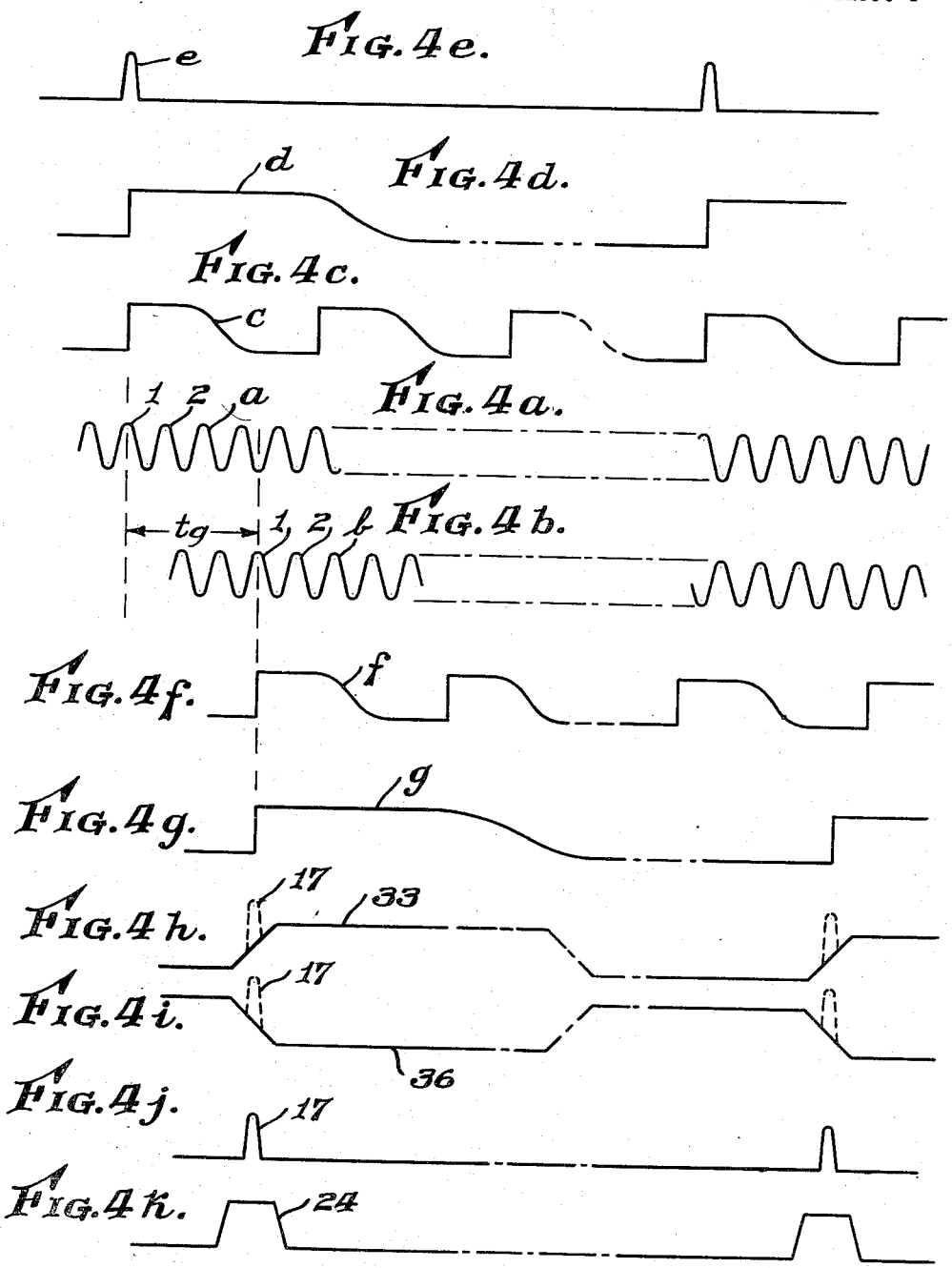

2,776,427

INDICATOR AND/OR CONTROL SYSTEM FOR PULSE-ECHO APPARATUS

Alda V. Bedford, Collingswood, N. J., assignor to Radio Corporation of America, a corporation of Delaware Application June 17, 1942, Serial No. 447,371

5 Claims. (Cl. 343—13)

My invention relates to pulse echo systems and particularly to methods and systems for determining and/or indicating range or distance.

The invention will be described particularly with reference to an automatic range control system for anti-aircraft guns or the like. It has previously been proposed to determine range or distance of an object by transmitting a radio pulse and receiving the pulse after reflection from the object together with a time reference wave whereby the time between transmission and reception of the pulse may be determined. Since a radio wave travels at a known speed the distance of the reflecting object is thus determined. The present system includes a phase shifting device for changing the phase relation of the timing wave and the reflected pulse whereby the distance of the reflecting object may be determined from the amount of phase shift when the timing wave and the reflected pulse are brought to a predetermined phase relation.

As applied to gun fire control, one object of the invention is to provide an improved indicator and/or automatic control for range.

A further object of the invention is to provide an improved method of and means for determining and/or indicating the range or distance of an object.

A further object of the invention is to provide an improved method of and means for positioning a mechanical element automatically in accordance with the range or distance of a remote object.

A still further object of the invention is to provide in a radio pulse-echo system an improved method of and means for determining the time between the transmission of a pulse and the reception of the pulse after reflection.

A still further object of the invention is to provide in a pulse-echo system a method of and means for rapidly calibrating the system.

In a preferred embodiment of the invention as employed for range indication and automatic gun fire control, the output of a crystal oscillator is divided in frequency to obtain a signal which keys a high frequency radio transmitter for producing the desired transmitted pulses. If these pulses strike an object, such as an airplane or ship, they are reflected back to a receiver where they may be amplified and supplied to a control circuit. The time interval between the instant the pulse leaves the transmitter and the instant it reaches the receiver after reflection is a measure of the distance to the object.

This time interval is determined by adding in a suitable mixing circuit the received pulse and a time reference pulse having a known time or phase relation to the transmitted pulse. The latter pulse may be obtained by passing signal from the crystal oscillator through an adjustable phase shifter coupled to a motor and then dividing the frequency by means of a chain of multi-vibrators or the like to obtain rectangular pulses recurring at the same frequency as the transmitted (and received) pulses.

The reason for starting with a high frequency such as a 819.4 kc. output from the crystal oscillator and dividing the frequency instead of simply starting with a lower frequency such as 4.1 kc. (the frequency of the keying pulses) is that it gives a very exact vernier control of the phase shift of the 4.1 kc. rectangular pulses, the accuracy being 200 times greater (assuming the division is by 200) than would be the case if the crystal oscillator supplied the lower frequency signal to the phase shifter. For example, a phase shift of one complete cycle of 819.4 kc. signal causes a phase shift of only 1/200 of one cycle at the 4.1 kc. output.

The reason for selecting the figures 819.4 kc. and 4.1 kc. which are the frequencies employed in the system to be described need not be discussed here except to say that they are arrived at, as is well known in the art, by taking into account both the speed of propagation of a radio wave and the maximum distance from which it is desired to receive reflected waves.

The rectangular time reference pulses supplied to the mixing circuits have steeply sloping sides so that when the reflected pulses are mixed therewith a selected reflected pulse can be made to "ride" on one of said steep sides by so adjusting the phase shifter that the rectangular pulses and the reflected pulses occur in the proper phase relation. Rectangular pulses of reversed polarity and the selected reflected pulses are also supplied to a second mixing circuit where they are added.

The outputs of the two mixing circuits are supplied to grid-leak biased amplifier tubes that function as peak rectifiers and which have their output circuits connected in balanced relation so that their direct current output is zero when the peak values of the two applied signals with respect to their A.-C. axes are the same. If these peak values are not the same, the resulting D. C. output will drive the motor connected to the phase shifter and the circuit will automatically be brought into balance. The position of the phase shifter determines the position of a pointer on a calibrated scale which, at this condition of balance, indicates the range of the object that is reflecting the pulses. Also, the phasing motor preferably drives syncro motors, such as Selsyn motors or the like, for supplying the range to a computer.

In accordance with another feature of my invention, I provide suitable lock-in or calibration connections between the multivibrators or other frequency divider elements of the two frequency dividers for the purpose of making them lock in on the proper cycle or pulse of the signal applied thereto. In this way the system may be quickly calibrated at zero range as soon as power is applied to it.

The system, when employed as a range finder, also preferably includes means for selecting the desired one of a plurality of reflected pulses and for keeping the system automatically under the control of this selected pulse. Thus a gun may be aimed at a particular airplane, for example, and the gun will continue to follow it automatically even though other airplanes fly close to the one selected.

The invention will be better understood from the following description taken in connection with the accompanying drawing in which Figure 1 is a circuit and block diagram of one embodiment of the invention as applied to a range finding system for indicating range and for supplying automatically and continuously the range to a computor or the like (not shown):

Figure 3 is a circuit and block diagram showing in more detail the frequency dividers and the lock-in or calibrating connections; and Figures 4a to 4k and Figure 5 are graphs which are referred to in explaining the invention.

In the several figures corresponding parts and curves are indicated by similar reference characters.

Figure 1:
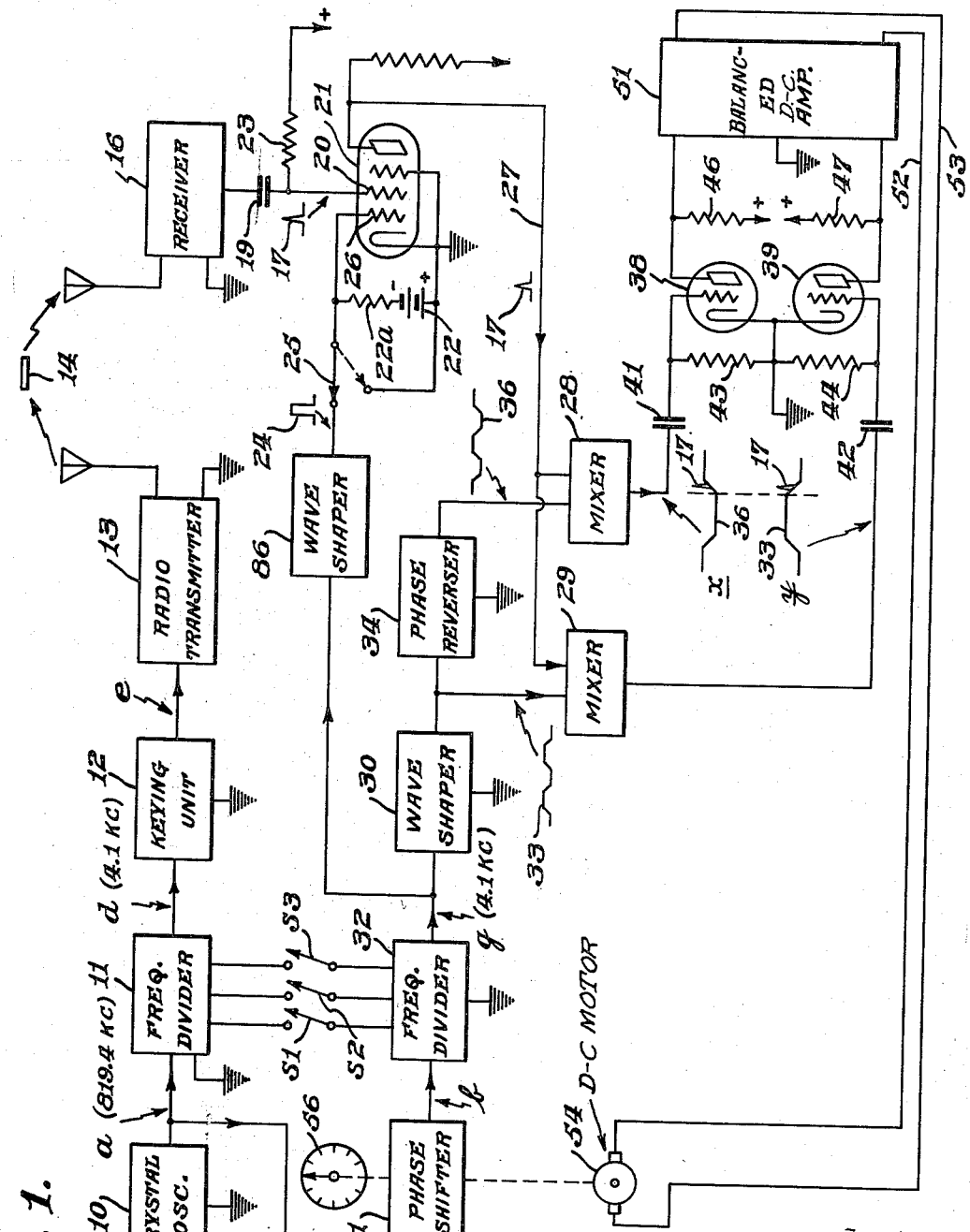

In Fig. 1, a crystal oscillator operating at 819.4 kilocycles is indicated at 10. Its output is supplied to a suitable frequency divider 11, which may be a chain of multivibrators, to divide the frequency by 200 and to produce pulses occurring at the rate of substantially 4.1 kc. per second. The 4.1 kc. pulses are applied to a keying unit 12 for keying a high frequency radio transmitter 13 whereby it radiates 4.1 kc. pulses of high frequency energy that will be reflected from an airplane or other distant object indicated at 14.

The reflected pulses of R.-F. energy are received by a suitable reeciver 16 and are detected to produce the 4.1 kc. pulses indicated at 17 which are supplied through a coupling condenser 19 to the screen grid 20 of a vacuum tube 21. A positive voltage is applied to the grid 20 through a resistor 23. The tube 21, in the example illustrated, is biased to plate current cut-off by means of a biasing batery 22 which applies a negative bias to a grid 26 through a grid resistor 22a.

As will be explained, a pulse 17 can pass through the tube 21 only when it is unblocked by a "gate" pulse 24 applied through a switch arm 25 to the grid 26 of tube 21. If a pulse 17 is received while the tube 21 is unblocked, it will pass over a conductor 27 to mixer circuits 28 and 29.

Referring now to the portion of the circuit for determining the time elapsed between transmission and reception of a pulse, signal from the oscillator 10 is passed through a phase shifter 31 to a frequency divider 32, which may be similar to the frequency divider 11, for producing 4.1 kc. pulses. These pulses are supplied through a wave shaper 30 to produce rectangular pulses having steeply sloping sides as shown at 33.

Lock-in or calibrating connections between the frequency dividers 11 and 32 are provided. These connections include switches S1, S2 and S3 which are closed to calibrate the system as will be explained later.

The pulses 33 are supplied to the mixer 29. Pulses from wave shaper 30 are reversed in phase by a suitable phase reversing means indicated at 34 to produce the pulses shown at 36. These pulses are applied to the mixer 28.

The outputs of mixers 28 and 29 are shown at x and y, respectively, as they appear for a balanced condition of the system. It will be noted that for the balanced condition (explained hereinafter) the pulses 17 are positioned halfway up on oppositely sloping sides of the pulses 36 and 33 whereby the peak of pulse 17 has the same amplitude from the bases of x and y. The ratio of one-half cycle of the rectangular pulses to a steeply sloping side of a pulse is 100 to 1 in the example being described. No attempt has been made to draw the pulses shown in the several figures to scale.

The outputs of mixers 28 and 29 are supplied to vacuum tubes 38 and 39, respectively, through grid condensers 41 and 42. Grid leak resistors 43 and 44 are provided which have sufficiently high resistance for a given capacity of the grid condensers to make most of the charge on the grid condensers (resulting from grid current flow) hold over between successive recurring signal peaks 17 whereby the tubes function as peak rectifiers. This type of grid leak biasing action in itself is well known.

The plate circuits of tubes 38 and 39 are connected in balanced relation, plate voltage being supplied through plate resistors 46 and 47, and they are coupled to a balanced D.-C. amplifier 51. The D.-C. amplifier 51 has its output circuit connected through a pair of conductors 52 and 53 to a direct-current motor 54.

If the mixer outputs are as shown at x and y, and if the circuits of the peak rectifier 38—39 and D.-C. amplifier 51 are properly balanced, there will be no flow of current to the motor 54. If, on the other hand, the time or phase relation between pulses 36 and 33 and the reflected pulses 17 is different than that shown at x and y, then current will flow to motor 54 and the phase shifter 31 will be rotated at a certain rate. The phase of the pulses 33 and 36 is thus either advanced or retarded with respect to the pulse 17 depending upon the direction of rotation of the motor 54 as determined by the direction of unbalance of the peak rectifier and D.-C. amplifier circuit. Consequently, the phase shifter is adjusted to a point where the peaks of pulses 17 are the same height above the A.-C. axis at tube 38 as at the tube 39. In other words, the system is automatically brought to the condition of balance illustrated in Fig. 1 at x and y.

It will be apparent from the foregoing that the position of the phase shifter at the above-mentioned condition of balance gives the time relation between the reflected pulses 17 and the time reference pulses 33 and 36. This gives the distance from the transmitter to the reflecting object 14 since radio waves travel at a known fixed speed; and the distance can be shown on properly calibrated dials such as the dial shown at 56. The same shaft that rotates the dial pointer may be coupled to syncro motors or the like for feeding the range information to a remotely positioned computer (not shown).

Figure 2:
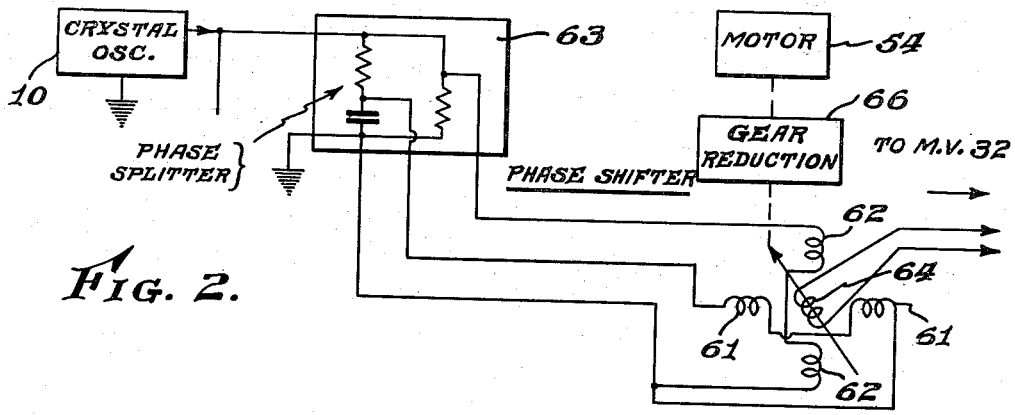
Figure 2 is a circuit diagram of the phase shifter in Fig. 1.

The phase shifter 31 may be of any suitable type such as that shown in Fig. 2 by way of example. It comprises a stator consisting of coils 61 and 62 positioned at right angles to each other and supplied with current from a phase splitter 63 so that the current in the coils 61 is substantially 90 degrees out of phase with the current in the coils 62 whereby a rotating field is produced. A rotor coil 64 is mechanically coupled to the motor 54 (preferably through a gear reduction unit 66) so that it may be rotated to different angular positions by operating the motor 54. In this way the voltage, induced in rotor coil 64 and supplied to the frequency divider 32, may have its phase either advanced or retarded a known amount with respect to the voltage supplied to the frequency divider 11 (Fig. 1) by the crystal oscillator 10.

Fig. 3 illustrates one prefererd embodiment of the frequency dividers 11 and 32 and their lock-in or calbrating connections. Since the two frequency dividers are identical, like parts are indicated by the same reference numerals with the letter A added to the reference numerals for divider 32.

Each frequency divider comprises three multivibrators 71, 72, 73 and 71A, 72A, 73A, respectively. The multivibrators in each divider chain may be alike except for the circuit constants required to make each multivibrator operate at the desired frequency and divide by the desired amount. In the example illustrated the frequency division is in three steps of 8, 5 and 5.

Referring to multivibrator 71, it comprises vacuum tubes 76 and 77 each having its anode coupled to the grid of the other tube through capacitors in the usual manner. While the multivibrator 71 (and the other multivibrators) may be of conventional design, it is preferred to include a tuned circuit 78 which is tuned to the frequency of the desired output whereby the stability of lock-in is improved. The tuned circuit 78 may be either in a plate circuit as shown or in one of the grid circuits.

The calibrating circuit for multivibrators 71 and 71A is a connection from the grid of tube 77 through a resistor 81, the switch S1 and the resistor 82 to the grid of tube 77A. There is a similar connection between multivibrators 72 and 72A through switch S2 and between multivibrators 73 and 73A through S3. The three switches preferably are ganged as indicated by the broken line 83. The calibrating connections between multivibrators may be between tube anodes instead of between the tube grids, if preferred.

Figure 5:
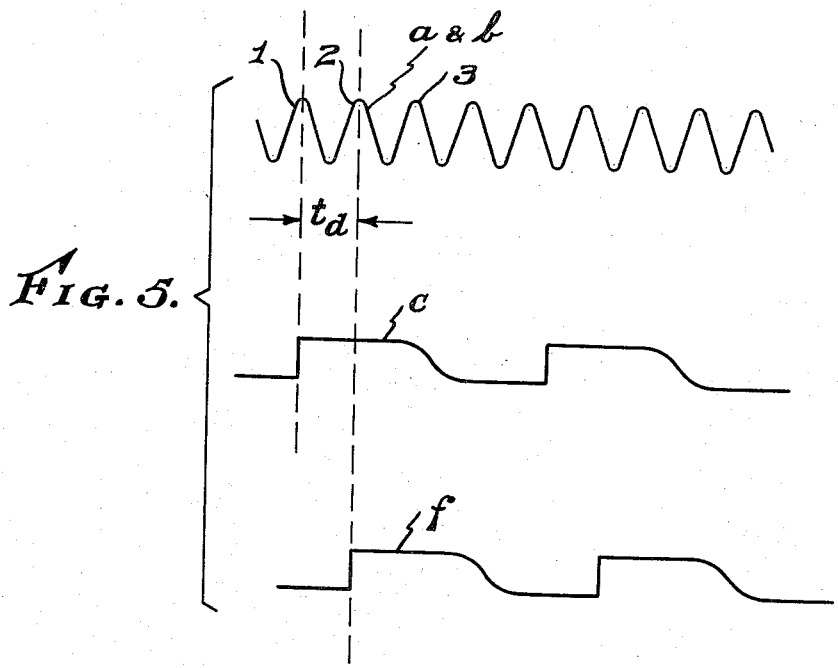

The calibrating switches S1, S2 and S3 should be closed momentarily to calibrate the system each time power is applied for energizing the multivibrators and other parts of the system. The reason that such calibration is required will be understood by referring to Fig. 5 where the graph marked a and b represents the output of oscillator 10 and the output of phase shifter 31 when it is adjusted for zero phase shift. Graph c represents the output of multivibrator 71 and graph f represents the output of multivibrator 71A. The multivibrators 71 and 71A should lock in on the same cycle of graph a and b. If they lock in on different cycles, such as cycles 1 and 2 as illustrated in Fig. 5, there will be a time delay $t_a$ between the start of a pulse (graph f) produced by M. V. 71A and the start of a pulse (graph c) produced by M. V. 71. If the multivibrators 71 and 71A lock in when the switch S1 is open, they may lock in on any cycle of the crystal oscillator output. Therefore, they may, by chance, lock in on the same cycle; they may lock in on cycles 1 and 2, respectively, as shown in Fig. 5; or they may lock in, for example, on cycles 1 and 3, respectively, to give a different time delay than the delay $t_a$.

However, as soon as the switch S1 is closed the multivibrators 71 and 71A lock in on the same cycle of graph a and b since one of the multivibrators 71 and 71A will trigger the other multivibrator through the connection 81—S1—82. Thus, if M. V. 71 triggers on cycle 1 as shown by graph c, the M. V. 71A will be made to trigger simultaneously on this same cycle. Similarly, closing switch S2 will make multivibrators 72 and 72A trigger simultaneously, and closing switch S3 will make multivibrators 73 and 73A trigger simultaneously.

The general operation of the system, particularly with respect to the matter of time delay and lock-in can be understood more readily by referring to Figs. 4a to 4k where Fig. 4a shows the output of oscillator 10 and Fig. 4b shows the same signal after it has been delayed a certain amount $t_g$ by the phase shifter 31. Figs. 4c and 4f show that the multivibrators 71 and 71A were locked in on the same cycle of the output of oscillator 10 before the phase shifter 31 was adjusted to introduce the phase shift or delay $t_g$. Thus, the time between the start of a pulse in signal c and the start of a pulse in signal f is the delay time $t_g$ as it should be.

Likewise, the other multivibrators in one chain have triggered simultaneously with their corresponding multivibrators in the other chain. For example, closing switch S3 caused the multivibrators 73 and 73A having outputs d and g to trigger simultaneously.

Figs. 4e and 4j show, respectively, the 4.1 kc. keying pulses e (derived from the signal d) and the reflected pulses 17 picked up at the receiver. It will be seen that the phase shift $t_g$ has been made such that the sloping sides of the pulses 33 and 36 (Figs. 4h and 4i) are centered with respect to the reflected pulse 17, at which point the motor 54 has stopped rotating the rotor of phase shifter 31. From the foregoing, it will be apparent that the phase shift $t_g$ is an accurate measurement of the time elapsed between a pulse e and a pulse 17, and, therefore, of the distance to the reflecting object.

The gate pulse 24 (Fig. 4k) may be obtained from the frequency divider 32 by means of a suitable wave-shaping circuit indicated at 86. The pulse 24 occurs in a fixed time relation to the pulses 33 and 36, this relation being such that it occurs in phase with the sloping sides of pulses 33 and 36 as shown by comparing Figs. 4h, 4i and 4k. As previously stated, no signal can pass through the tube 21 when the switch 25 is in the position shown unless the gate pulse is on the grid 26 at that time.

As described in application Serial No. 421,071, filed November 29, 1941, in the name of Ray D. Kell, entitled Indicator and/or Control System, suitable control apparatus (not shown) may be provided to enable the control officer to operate the phase shifter 31 by manual control whereby the gate pulse 24 may be moved under the desired reflected pulse as shown on a suitable cathode ray tube indicator (not shown). The pulses 33 and 36, of course, are shifted in phase simultaneously with the gate pulse 24 and in a fixed phase relation thereto whereby the selected pulse 17 falls on their steep sides.

Under certain conditions, as when the antenna system, which preferably is directive, is being rotated (by means not shown) to search for enemy airplanes, it is desired that any received pulse will operate the system automatically. To permit this, the gate switch 25 is moved to the dotted line position whereby the tube 21 is no longer biased to cut-off and will pass any received pulse 17 that is applied to the grid 20.

I claim as my invention:

1. In a system for determining the time relation between a transmitted electrical pulse and a reflected electrical pulse, two signal channels, a comparatively high-frequency stable oscillator connected to supply signal to said two signal channels, a frequency divider in one of said channels for dividing said high frequency to a comparatively low frequency to produce a comparatively low frequency signal, means for producing periodically recurring keying pulses in synchronism with said low frequency signal, a radio transmitter and means for keying said transmitter by said keying pulses, a frequency divider in the other of said channels for dividing said high frequency to said comparatively low frequency to produce a time reference signal, means for producing periodically recurring time reference pulses in synchronism with said time reference signal, a phase-shifting device connected in one of said channels between the high-frequency oscillator and the frequency divider in said one channel, means for receiving the pulses radiated by said transmitter after they have been reflected, a utilization circuit, means for supplying the reflected pulses and the time-reference pulses to said utilization circuit, means for adjusting said phase-shifting device whereby the time interval between a reflected pulse and a time-reference pulse may be determined, each of said frequency dividers comprising a plurality of frequency divider units connected in cascade, and a lock-in connection between each divider unit of one frequency divider and the corresponding divider unit of the other frequency divider for calibrating said system.

2. In a system for determining the time relation between a transmitted electrical pulse and a reflected electrical pulse, two signal channels, a comparatively high-frequency stable oscillator connected to supply signal to said two signal channels, a frequency divider in one of said channels for dividing said high frequency to a comparatively low frequency to produce a comparatively low frequency signal, means for producing periodically recurring keying pulses in synchronism with said low frequency signal, a radio transmitter and means for keying said transmitter by said keying pulses, a frequency divider in the other of said channels for dividing said high frequency to said comparatively low frequency to produce a time reference signal, means for producing periodically recurring time-reference pulses in synchronism with said time reference signal, a phase-shifting device connected in one of said channels between the high-frequency oscillator and the frequency divider in said one channel, means for receiving the pulses radiated by said transmitter after they have been reflected, a utilization circuit, means for supplying the reflected pulses and the time-reference pulses to said utilization circuit, means for adjusting said phase-shifting device whereby the time interval between a reflected pulse and a time-reference pulse may be determined, each of said frequency dividers comprising a plurality of relaxation oscillators connected in cascade, and a plurality of lock-in connections between the oscillators of one frequency divider and the corresponding oscillators of the other frequency divider, respectively, for calibrating said system.

3. In combination, a first signal channel and a second signal channel, a comparatively high-frequency stable oscillator connected to supply signal to said first signal channel and said second signal channel, a frequency divider in said first channel for dividing said high frequency to a comparatively low frequency to produce a comparatively low frequency signal, means for producing periodically recurring pulses in synchronism with said low frequency signal, a frequency divider in said second channel for dividing said high frequency to said comparatively low frequency to produce a time reference signal, means for producing periodically recurring time-reference pulses in synchronism with said time reference signal, a phase-shifting device connected in one of said channels between the high frequency oscillator and the frequency divider in said one channel, a utilization circuit, means for supplying the pulses from said first channel and the time-reference pulses from said second channel to said utilization circuit, means for adjusting said phase shifting device whereby the time interval between a pulse from said first channel and a time-reference pulse may be determined, each of said frequency dividers comprising a plurality of frequency divider units connected in cascade, and a lock-in connection between each divider unit of one frequency divider and the corresponding divider unit of the other frequency divider.

4. In combination, a first signal channel and a second signal channel, a comparatively high-frequency stable oscillator connected to supply signal to said first signal channel and said second signal channel, a frequency divider in said first channel for dividing said high frequency to a comparatively low frequency to produce a comparatively low frequency signal, means for producing periodically recurring pulses in synchronism with said low frequency signal, a frequency divider in said second channel for dividing said high frequency to said comparatively low frequency to produce a time reference signal, means for producing periodically recurring time-reference pulses in synchronism with said time reference signal, means connected in one of said channels between the high frequency oscillator and the frequency divider in said one channel for changing the phase relation between the output of said high-frequency oscillator and the output of said one channel, a utilization circuit, means for supplying the pulses from said first channel and the time-reference pulses from said second channel to said utilization circuit, each of said frequency dividers comprising a plurality of frequency divider units connected in cascade, and a lock-in connection between each divider unit of one frequency divider and the corresponding divider unit of the other frequency divider.

5. The invention according to claim 4 wherein each of said divider units includes an electron discharge device having a plurality of electrodes, and wherein each of said lock-in connections comprises means for connecting an electrode of a discharge device of one divider unit to a like corresponding electrode of the discharge device in the other divider unit.

References Cited in the file of this patent

UNITED STATES PATENTS

| | | |
|---|---|---|
| 1,924,174 | Wolf | Aug. 29, 1933 |
| 2,134,716 | Gunn | Nov. 1, 1938 |
| 2,268,643 | Crosby | Jan. 6, 1942 |

FOREIGN PATENTS

| | | |
|---|---|---|
| 113,233 | Australia | June 2, 1941 |